Dec. 15, 1942.  W. S. HAYFORD  2,305,473
METHOD AND MEANS FOR JOINING HOLLOW BODIES
Filed Dec. 17, 1940
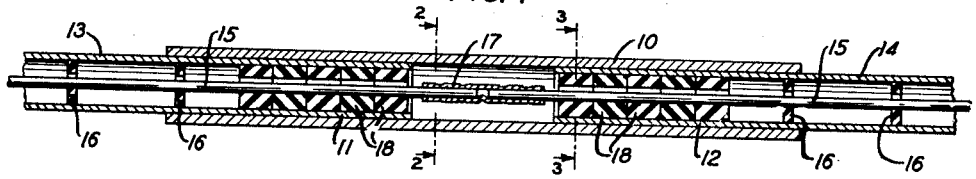
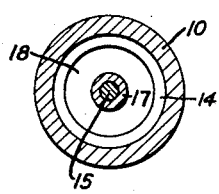 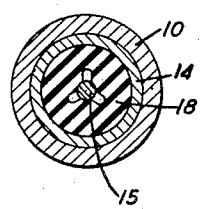
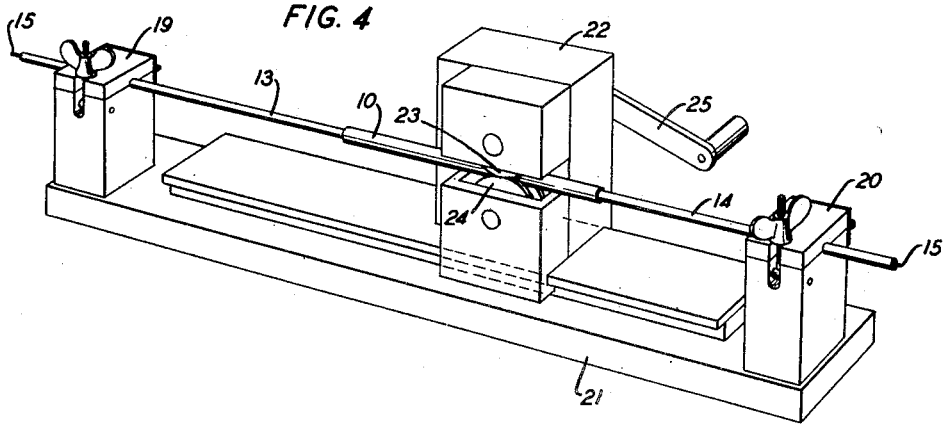
INVENTOR
W. S. HAYFORD
BY J. MacDonald
ATTORNEY Patented Dec. 15, 1942

2,305,473

UNITED STATES PATENT OFFICE 2,305,473

METHOD AND MEANS FOR JOINING HOLLOW BODIES

Walter S. Hayford, Morristown, N. J., assignor to Bell Telephone Laboratories, Incorporated, New York, N. Y., a corporation of New York Application December 17, 1940, Serial No. 370,448

3 Claims. (Cl. 174—88)

This invention relates to joints in hollow cylindrical electrical conductors and more particularly to a method and means for making joints by a metallic sleeve in coaxial electrical conductors which comprise an outer metallic conductor of substantially circular cross-section and an inner conductor spaced away from and insulatingly supported along the longitudinal axis of the outer conductor.

An object of the present invention is to provide means for joining two hollow cylindrical bodies together and in abutting relationship by means of a sleeve in tight frictional engagement therewith without substantial deformation of the members joined.

Another object of the invention is the provision of a method and means for joining together hollow cylindrical bodies which contemplate the use of reinforcing means in the ends of the members to be joined, which permits sufficient pressure to be exerted thereon to force the sleeve into intimate contact with the ends of the hollow bodies without collapsing the said hollow bodies.

A further object of this invention is the provision of a joint in hollow cylindrical bodies which will render said joint gas and moisture tight and be as strong mechanically as the bodies themselves.

A still further object of this invention is the provision of a joint in hollow cylindrical conductors which will have an electrical resistance comparable with that of the conductor itself.

Heretofore, it has been common practice in the joining of hollow metallic electric conducting bodies together by means of an external sleeve to coat or tin the ends of the bodies to be joined with solder or the like, positioning the sleeve over the ends of the bodies and applying sufficient heat to sweat the sleeve to the ends of the hollow bodies.

Not only does this type of joint require a great amount of skill on the part of the operator, due to the fact that the quality of the joint will depend upon the experience of the person making this joint, but due to the application of heat to the bodies to be joined, the strength of the material is considerably reduced due to the annealing action of the heat on the bodies joined. Furthermore, it is not always practicable and possible to apply sufficient heat to the sleeve and its associated hollow bodies to join them together in a perfect manner. For example, in manholes which might contain combustible gases it would be very impracticable if not dangerous to use a blow torch or some other such method of sweating the sleeve in place and it is also impracticable and difficult for a telephone lineman exposed to low temperatures to properly do a job of this nature while on the top of a telephone pole.

It is well known that joints made in this manner are liable not only to have a very high resistance due to the action elements thereon but are also mechanically weak.

In applicant's improved joint, which comprises a metallic sleeve forced down into intimate contact with the abutting ends of the bodies to be joined, the tensile strength of the joint will not only be greater than the tensile strength of the bodies which it joins but will be gas and moisture-proof as well. Due to the fact that the bodies to be joined and the sleeve itself are not impaired in any way, the strength of the joint will compare favorably with the strength of the hollow bodies themselves.

Inasmuch as suitable means is required for forcing the sleeve down into intimate contact with the abutting ends of the hollow bodies, the applicant has found that a suitable rolling tool is quite satisfactory for the job inasmuch as this tool can be made compact enough to be transported around very easily and furthermore it does not require a great amount of skill on the part of the operator to make a perfect joint, also the human element is almost entirely removed and a perfect joint is always assured.

Not only will it take considerably less time to make a joint in accordance with applicant's invention, but it can be made in any location and under any and all conditions and instead of making the joint the weak point of the installation the joint is in reality the strongest point.

In accordance with the provisions of my invention the ends of the hollow cylindrical bodies to be joined are each provided with one or more bead-like members in close contact with each other. If it is desired, a conductor or any other suitable means may extend through the hollow body, as for example, in a coaxial conductor as shown. The ends of the hollow bodies containing the beads or bushings are positioned in the opposite ends of a metallic sleeve with their ends in abutting relationship. The assembly is then positioned in a suitable tool and the sleeve forced down into contact with the ends of the hollow cylindrical bodies to form an intimate contact therewith. Due to the beads or spacers on the interior of the hollow bodies, a substantially incompressible means is provided which prevents the bodies from collapsing but will permit a slight deformation of the bodies to allow the sleeve to be forced down into intimate contact with the hollow bodies to form a gas and moisture-proof joint.

Referring now to the drawing,

Fig. 1 is a longitudinal sectional view of applicant's improved joint.

Fig. 2 is an enlarged cross-sectional view taken on line 2—2 of Fig. 1;

Fig. 3 is an enlarged cross-sectional view taken on lines 3—3 of Fig. 2;

Fig. 4 illustrates one form of tool which may be utilized for forcing the sleeve into intimate contact with the ends of the hollow bodies.

As shown in Fig. 1, the joint of this invention comprises a sleeve member 10 fitted over and embracing the ends of the hollow cylindrical bodies or outer conductors 13 and 14 which extend some distance into the sleeve. In the illustration shown, the joint of this invention is shown securing together the ends 11 and 12 of the coaxial conductors 13 and 14 which comprise an outer conductor or hollow member and an inner solid conductor 15. The inner conductor 15 extends longitudinally of the outer conductor and is held in spaced relation with respect to the inner walls of the outer conductor by a series of washers 16. The ends of the inner conductor 15 are joined together by any suitable means, for example, a metal sleeve 17 which may be secured in any suitable manner by means of a pair of pliers which will exert a compressing action on the sleeve. Located in the ends 11 and 12 of the conductors 13 and 14 are one or more beads or bushing 18. These beads are positioned close to each other and form a long substantially incompressible insert or bushing which acts as a reinforcement for the ends of the outer conductors to prevent their collapse when pressure is applied to the sleeve.

In making the joint shown and described heretofore, the first step is to cut back a portion of the outer conductors 13 and 14 at their ends to expose the inner conductor 15. One or more beads or bushings 18 are then threaded over the inner conductor and positioned close to the ends of the outer conductors 13 and 14. With the beads 18 in position on the inner conductor 15, the ends thereof are joined by any suitable means, for example, by the metallic sleeve 17, which may be compressed or otherwise secured to the ends of the conductors. The sleeve 10 which has been previously positioned on one of the outer conductors is moved over into position so that the ends 11 and 12 of the outer conductor extend an equal distance into the sleeve. The sleeve 10 is then ready to be forced into intimate contact with the ends 11 and 12 of the outer conductors 13 and 14.

The sleeve 10 may be forced down into contact with the outer conductors in any suitable manner, for example, by the rolling device shown in Fig. 4 which comprises a pair of clamping members 19 and 20 secured to a base 21 for holding the ends 11 and 12 of the outer conductors 13 and 14 in juxtaposition. A block 22 having operatively mounted thereon a pair of grooved rollers 23 and 24, is slidably mounted on the base 21. Said rollers are adapted to receive and roll the sleeve 10 down into intimate contact with the ends 11 and 12 of the outer conductors 13 and 14 by means of the operation of the handle 25. The rolling action of this device starts at one end of the sleeve and continues along until the entire length of the sleeve has been traversed.

Due to the fact that the ends 11 and 12 of the outer conductors 13 and 14 are reinforced by means of substantially incompressible beads 18, the outer conductor will be deformed only slightly and then only a sufficient amount to permit the sleeve to be rolled down in such a manner that a gas and moisture-proof seal is effected. Furthermore, such a joint will be as strong as the members which it joins and will have an electrical resistance comparable with that of the joined members.

I do not limit myself to any specific tool for forcing the sleeve into contact with the hollow cylindrical members or conductors. It is to be understood that the invention is not limited to the specific details shown but only by the scope of the appended claims.

What is claimed is:

1. In combination with a pair of coaxial cables, each composed of a single, hollow outer conductor and a solid inner conductor of means for joining said cables together which comprises means for joining together the ends of the inner conductors, a plurality of insulating members threaded over the ends of said inner conductors and located inside the outer conductors near their ends, said insulating members being in close contact with each other and having perforations therein to permit the passage of gas therethrough and a sleeve positioned over the abutting ends of the inner conductors and engaging the adjacent ends of the outer conductors, said sleeve being secured in position by having a force applied thereto along its entire outer surface to effect an intimate contact between the inner surface of the sleeve and the outer surface of the outer conductors, said insulating members providing a flexible yet substantially incompressible reinforcing means for permitting a slight deformation of the bodies and still provide a gas-tight joint.

2. In combination with a pair of coaxial cables, each composed of a single, hollow outer conductor and a solid inner conductor spaced away and insulated from said outer conductor by a plurality of spaced apart perforated discs, of means for joining said cables together which comprises a metal sleeve for joining together said inner conductors, a plurality of insulating members, having a diameter substantially greater than their thickness, threaded over said inner conductors, and located inside the outer conductors and adjacent the ends thereof, said insulating members in close contact with each other and having perforations therein to permit the passage of gas, and a sleeve positioned over the abutting ends of the inner conductors and engaging the adjacent ends of the outer conductors, said sleeve secured in position by having force applied along its entire outer surface to effect an intimate contact between the inner surface of the sleeve and the outer surface of the outer conductor, said insulating members providing a flexible yet substantially incompressible reinforcing means for permitting a slight deformation of the bodies and still provide a gas-tight joint.

3. A method of making a gas-tight joint in coaxial cables of the type which comprises an outer hollow conductor and an inner conductor spaced away and insulated from said outer conductor which consists in cutting back a portion of the outer hollow conductor to expose a short length of the inner conductor on each end of the cables to be joined, threading over the inner conductor of each cable a plurality of beadlike insulating members, said members lying close to each other and positioned inside the ends of the outer conductors, securing a metal sleeve over the abutting ends of the inner conductors and firmly securing it thereto, positioning a metallic sleeve over the ends of the outer conductors and then forcing said sleeve into intimate contact with said outer conductors by applying force along the entire outer surface of said sleeve.

WALTER S. HAYFORD.